US008676846B2

(12) United States Patent
Pooley et al.

(10) Patent No.: US 8,676,846 B2
(45) Date of Patent: *Mar. 18, 2014

(54) METHODS, SYSTEMS, AND COMPUTER PROGRAM PRODUCTS FOR PROVIDING A GENERIC DATABASE SECURITY APPLICATION USING VIRTUAL PRIVATE DATABASE FUNCTIONALITY WITH A COMMON SECURITY POLICY FUNCTION

(71) Applicant: AT&T Intellectual Property I, L.P., Reno, NV (US)

(72) Inventors: James Pooley, Piscataway, NJ (US); Dhanshri Phondge, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/688,936

(22) Filed: Nov. 29, 2012

(65) Prior Publication Data

US 2013/0091173 A1  Apr. 11, 2013

Related U.S. Application Data

(63) Continuation of application No. 12/627,226, filed on Nov. 30, 2009, now Pat. No. 8,386,448.

(51) Int. Cl.
*G06F 17/30* (2006.01)

(52) U.S. Cl.
USPC ..... 707/785; 707/702; 707/783; 707/999.007

(58) Field of Classification Search
None
See application file for complete search history.

(56) References Cited

U.S. PATENT DOCUMENTS

| 6,587,854 B1 | 7/2003 | Guthrie et al. | |
|---|---|---|---|
| 6,606,627 B1* | 8/2003 | Guthrie et al. | 1/1 |
| 2006/0149786 A1* | 7/2006 | Nishiyama | 707/200 |
| 2009/0043775 A1* | 2/2009 | Cotner et al. | 707/9 |

OTHER PUBLICATIONS

Oracle Virtual Private Database, *An Oracle Database 10g Release 2 White Paper*, Jun. 2005, 21 pages.

* cited by examiner

*Primary Examiner* — Anteneh Girma
(74) *Attorney, Agent, or Firm* — Myers Bigel Sibley & Sajovec PA (57) ABSTRACT

Methods for providing a generic database security application using virtual private database (VPD) functionality are provided. The methods may include inserting rows into a user security table in a database providing VPD functionality, each row comprising a user ID for which database access is to be controlled, the name of a database object to be secured, and a predicate; and defining a security policy function common to all secured database objects, said security policy function generating a second predicate to be appended by the database's VPD functionality to queries made on a queried secured database object by a querying user, said second predicate based on at least one predicate in at least one row in the user security table, the at least one row referencing the name of the queried secured database object and the user ID of the querying user. Related systems and computer program products are also provided.

9 Claims, 7 Drawing Sheets

METHODS, SYSTEMS, AND COMPUTER PROGRAM PRODUCTS FOR PROVIDING A GENERIC DATABASE SECURITY APPLICATION USING VIRTUAL PRIVATE DATABASE FUNCTIONALITY WITH A COMMON SECURITY POLICY FUNCTION

RELATED APPLICATION

This application is a continuation of U.S. application Ser. No. 12/627,226, filed Nov. 30, 2009, the disclosure of which is hereby incorporated herein by reference as if set forth in its entirety.

BACKGROUND

This disclosure relates to database security and, more particularly, to methods, systems, and computer program products for providing a database security application, and systems and/or computer program products that implement such methods.

One approach for implementing security policies for restricting data access to data stored in a relational database is to embed the security logic within the applications that actually perform the data access. While an application-based security policy may provide a sufficient level of granularity (i.e., data access restrictions at the level of an individual user), it may not offer a sufficient level of security, because users with access to database query or reporting tools may be able to bypass the access control mechanisms implemented by the application. Moreover, any changes to the security policies may involve modifications to the application itself, which may require the time-consuming and expensive design, testing, and deployment of a new version of the application.

Another approach used in conjunction with application-enforced security is the use of a database object known as a "view." A view can be a stored query that is accessible as a "virtual table" composed of the result set of the query. Views may be used to partition a database table into multiple "virtual tables," each containing only a subset of the rows and/or columns present in the actual underlying database table or tables. However, the use of views may not be a practical means to implement a security policy, particularly where a large number of views is necessary. For instance, using views to limit a customer's access to their own records may be feasible if there are only 10 customers and, thus, 10 views, but may be impractical if there are 10,000 customers, requiring the design, testing, implementation, and maintenance of 10,000 separate views. Additionally, users with sufficient database access to the underlying tables may be able to bypass views and the security policies implemented therein.

"Virtual private database" (VPD) functionality provided by some databases may allow server-enforced, fine-grained data access control through the use of dynamic query modification to enforce security policies on database objects. VPD is discussed in more detail in, for example, U.S. Pat. No. 6,587,854 to Guthrie et al. and U.S. Pat. No. 6,606,627 to Guthrie et al., as well as in "Oracle Virtual Private Database: An Oracle Database 10 g Release 2 White Paper," June 2005.

SUMMARY

Embodiments according to the invention can provide methods, devices, systems, and computer program products for providing a generic database security application. Pursuant to these embodiments, a method for providing a generic database security application can be provided using a common security policy function in conjunction with the virtual private database (VPD) functionality of a database. One or more rows are inserted into a user security table in the database, each row comprising a first user ID or user group for which database access is to be controlled, the name of a first database object to be secured in the database, and a first predicate. The common security policy function, which generates a second predicate to be appended by the database's VPD functionality to queries made on a queried secured database object by a querying user, is defined in the database and associated using the database's VPD functionality with each database object named in the user security table. The second predicate generated by the common security policy function is based on at least one first predicate in at least one row in the user security table, the at least one row referencing the name of the queried secured database object and the user ID or user group of the querying user.

In some embodiments according to the invention, the method further includes, in response to the querying user's logging into the database and prior to the querying user's querying the database, retrieving from the user security table at least one row referencing the user ID or user group of the querying user; and storing the first predicate from each retrieved row in a session-persistent storage. In other embodiments according to the invention, the second predicate generated by the common security policy function is based on at least one first predicate retrieved from the session-persistent storage.

In further embodiments according to the invention, the method additionally includes inserting one or more rows into an object context table in the database, each row comprising the name of a second database object to be secured in the database, and a lock indicator. The lock indicator signals whether access to the second database object should be denied for all querying users. The object context table is linked with the user security table, such that the first database object named in each row in the user security table corresponds to a second database object named in a row in the object context table. The second predicate generated by the common security policy function is further based on the lock indicator.

In additional embodiments according to the invention, the method also includes inserting one or more rows into a user table in the database, each row comprising a second user ID and, optionally, a user group, for which database access is to be controlled. The user table is linked with the user security table, such that the first user ID or user group in each row in the user security table corresponds to a second user ID or user group in a row in the user table. The querying user is allowed to log in to the database only if the querying user's user ID is present in the user table or is determined to be otherwise privileged.

Embodiments have been described herein primarily with respect to methods for providing a generic database security application using virtual private database functionality with a common security policy function. However, analogous computer systems and computer-based methods for providing a generic database security application using virtual private database functionality with a common security policy function may also be provided according to other embodiments.

Other methods, systems, and/or computer program products according to other embodiments will be or become apparent to one with skill in the art upon review of the following drawings and detailed description. It is intended that all such additional systems, methods, and/or computer program products be included within this description and be protected by the accompanying claims.

DETAILED DESCRIPTION OF EMBODIMENTS

Methods for providing a generic database security application using virtual private database functionality with a common security policy function, as well as related systems and computer program products, will now be described more fully hereinafter with reference to the accompanying drawings, in which illustrative embodiments are shown. However, it will be appreciated that these methods for a generic database security application using virtual private database functionality with a common security policy function, as well as related systems and computer program products, may be embodied in many different forms, and thus the present application should not be construed as limited to the embodiments set forth herein. Rather, these embodiments are provided so that this disclosure will be thorough and complete, and to fully convey the scope of the embodiments to those skilled in the art. Like numbers refer to like elements throughout.

The terminology used herein is for the purpose of describing particular embodiments only and is not intended to be limiting of the embodiment. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled", "directly connected," or "directly responsive" to another element, there are no intervening elements present. Like numbers refer to like elements throughout. As used herein the term "and/or" includes any and all combinations of one or more of the associated listed items.

It will be understood that, although the terms first, second, etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which this embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present embodiments may be methods, systems, and/or computer program products. Accordingly, embodiments may be entirely hardware, entirely software, or a combination of software and hardware aspects. Furthermore, embodiments may take the form of a computer program product on a computer-readable storage medium having computer-usable program code embodied in the medium. A non-exhaustive list of specific examples of the computer-readable storage medium would include the following: a portable computer diskette, a random access memory (RAM), a read-only memory (ROM), an erasable programmable read-only memory (EPROM or Flash memory), and a portable compact disc read-only memory (CD-ROM) or digital versatile disc (DVD). Any suitable computer-readable storage medium may be utilized including hard disks, CD-ROMs, optical storage devices, or magnetic storage devices.

Embodiments are also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller, or other processor, such that the instructions which execute on the processor(s) create means for implementing the functions specified in the block or blocks. The computer program instructions may be executed by the processor circuit(s) to cause a series of operational steps to be performed by the processor circuit(s) to produce a computer implemented process such that the instructions which execute on the processor circuit(s) provide steps for implementing the functions specified in the block or blocks.

Accordingly, the blocks support combinations of means for performing the specified functions, combinations of steps for performing the specified functions, and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations in embodiments may be written in a procedural language provided by a database environment, such as PL/SQL in an Oracle database or Transact-SQL in Microsoft or Sybase databases, and/or a programming language such as Java, C++, JavaScript, Visual Basic, Perl, or in various other programming languages. Software embodiments do not depend on implementation with a particular programming language. The code, or portions thereof, may execute entirely on one or more servers, or it may execute partly on a server and partly on a client within a client device or as a proxy server at an intermediate point in a communications network.

In the latter scenario, the client device may be connected to a server over a LAN or a WAN (e.g., an intranet), or the connection may be made through the Internet (e.g., via an Internet Service Provider). It is understood that the present embodiments are not TCP/IP-specific or internet-specific. Exemplary embodiments may be implemented using various protocols over various types of computer networks.

As will be appreciated by one of skill in the art, embodiments may be executed on or include a database executing on a single computer, or executing on a high-availability cluster comprising two or more computers. As discussed herein, the term "database object" refers to a database table, view, synonym, or other construct with which a security policy may be associated by the database's VPD functionality. The term "security policy function" refers to the function that is associated with a database object or objects by the database's VPD functionality, and that generates the predicate to be appended to queries on the database object by the database's VPD functionality. The term "common security policy function" refers to a security policy function that is associated with (i.e., is common to) multiple database objects. It will be understood that the term "user," as used herein, may refer to any entity (e.g., an individual, a computer, or an application executing on a computer) that issues queries to a database during a database session. It will be further understood that the term "session-persistent storage" refers to any mechanism, such as an application context in an Oracle database environment, for allowing the storage and retrieval of data for the duration of a user's database session.

Methods, systems, and computer program products are disclosed herein that may be used to provide a generic database security application using virtual private database functionality with a common security policy function. As such, these methods, systems, and computer program products may be used to provide fine-grained control over access to data, while simplifying the design, implementation, and maintenance of the database security application.

Figure 1:
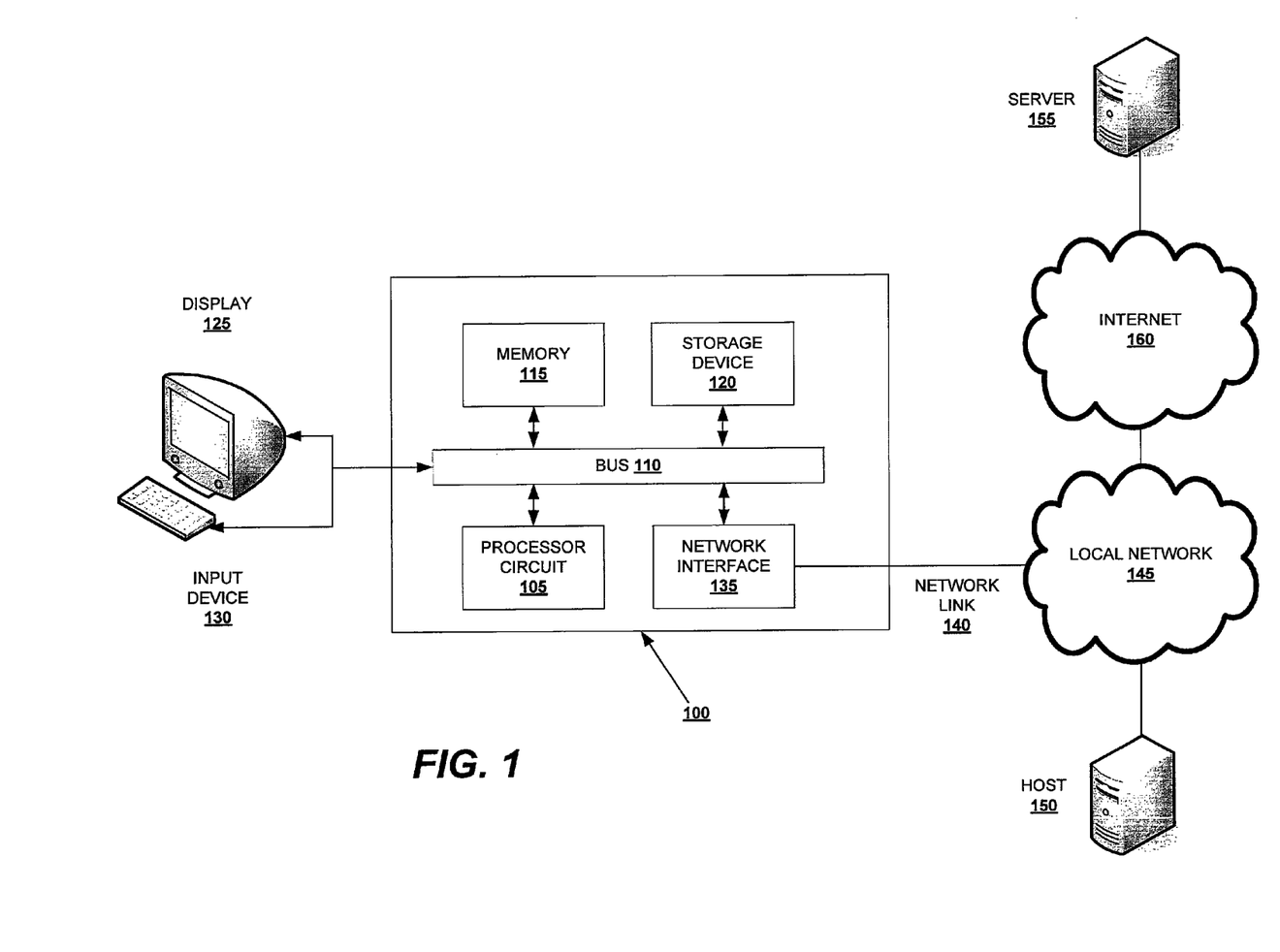
FIG. 1 is a block diagram illustrating a computer system on which some embodiments may be implemented.

FIG. 1 is a block diagram illustrating a computer system 100 on which the methods, systems, and computer program products described herein may be used. Computer system 100 may include a processor circuit 105 for processing commands and information, and which may be communicatively coupled to bus 110. The processor circuit 105 may be embodied, for example, as one or more enterprise, application, personal, pervasive, and/or embedded computer systems and/or special purpose hardware that may be centralized and/or distributed and connected by a wired network and/or a wireless network. Computer system 100 may also include main memory 115 communicatively coupled to bus 110. Main memory 115 may include a random access memory (RAM) or other volatile storage device for storing executing applications or intermediate information during execution of instructions by processor circuit 105, and/or a read-only memory (ROM) or other non-volatile storage device for storing static information and instructions for processor circuit 105. Computer system 100 may further include storage device 120, such as a hard disk drive or other magnetic media device, a compact disc (CD) or digital versatile disc (DVD) drive or other optical media device, or a flash drive or other solid-state device, communicatively coupled to bus 110. Storage device 120 may be used for storing instructions and data for processing by processor circuit 105. Computer system 100 may be communicatively coupled via bus 110 to display 125, such as a liquid-crystal display (LCD) or cathode ray tube (CRT) monitor. Computer system 100 may also be communicatively coupled via bus 110 to input device 130, which may be a device such as a keyboard for entering alphanumeric input, or a mouse, trackball, or touch pad for providing cursor control.

Computer system 100 may also include a network interface 135 communicatively coupled to bus 110. Network interface 135, such as a wired or wireless network interface card (NIC), a modem, or other communications device, may provide a bi-directional data communication coupling via network link 140 to a local network 145. Network link 140 may provide data communication to, e.g. host computer 150 via local network 145, or to server computer 155 via the internet 160. In this way, computer system 100 may send and receive message and data, including program code, through network interface 135 and network link 140.

The invention is related to the use of computer system 100 for implementing the methods, systems, and/or computer program products described herein. According to some embodiments of the invention, the methods are performed by computer system 100 in response to processor circuit 105 executing one or more sequences of one or more instructions contained in main memory 115. Such instructions may be read into main memory 115 from another computer-readable medium, such as storage device 120. Execution of the sequences of instructions contained in main memory 115 causes processor circuit 105 to perform the steps described herein. In alternative embodiments, hardware circuitry may be used in place of or in combination with software instructions to implement the invention. Thus, embodiments of the invention are not limited to any specific combination of hardware circuitry and software. Moreover, it will be appreciated by one of skill in the art that embodiments of the invention may be implemented on a single computer system 100, or may be implemented on, e.g., a high-availability cluster of two or more computer systems, each substantially similar to computer system 100.

Figure 2:
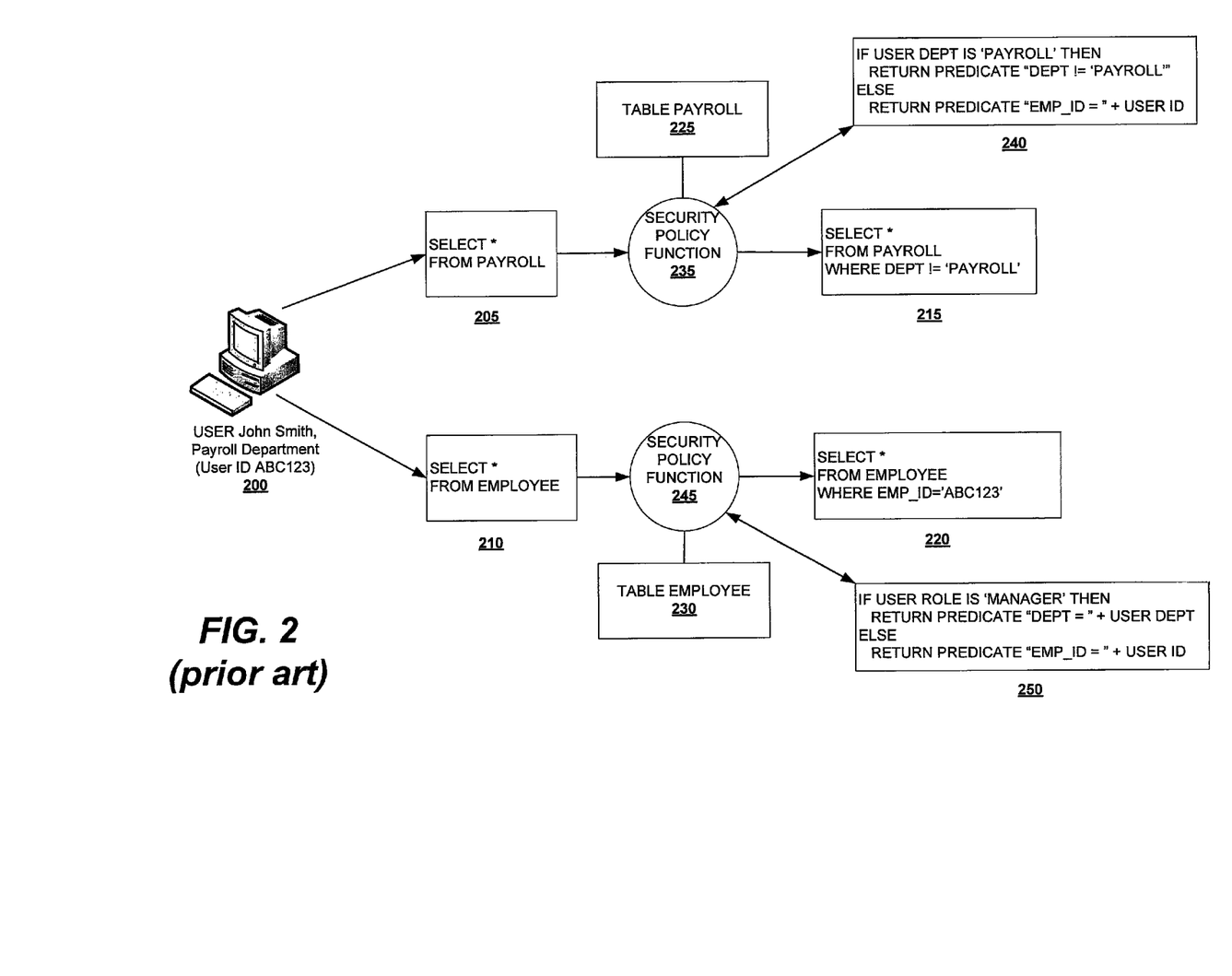
FIGS. 2 and 3 are block diagrams illustrating a method, known in the art, for using VPD in conjunction with multiple security policy functions to modify database queries in order to restrict access to data on a per-user basis.
Figure 3:
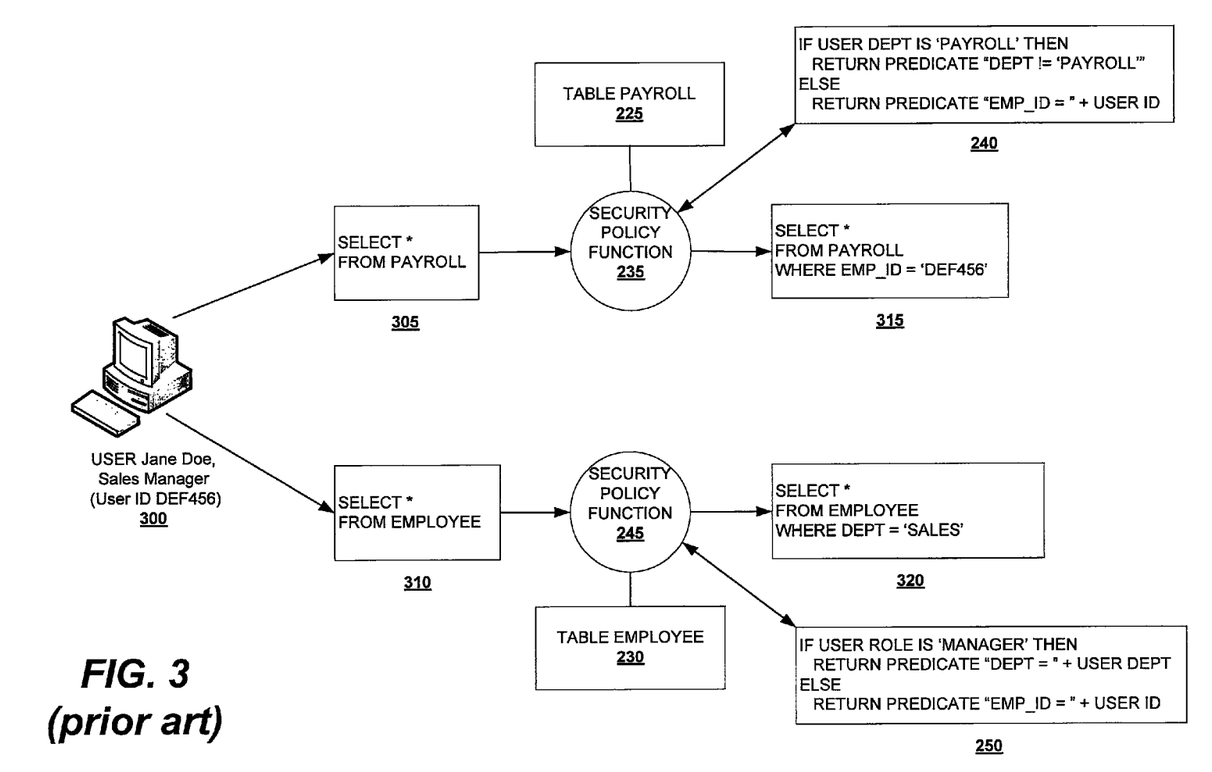

FIGS. 2 and 3 are block diagrams illustrating methods known in the art for using the VPD functionality of a database in conjunction with multiple security policy functions to modify database queries in order to restrict access to data on a per-user basis. VPD may rely on dynamic query modification to enforce security policies on secured database objects. A user or application querying a database object with an associated security policy causes VPD to dynamically modify the query by appending a SQL "WHERE" clause (referred to herein as a "predicate") that is generated by a function implementing the security policy. The query modification is transparent to the user, and, because the function generating the predicate is associated directly with the database object and invoked by the database server, the security measures provided by VPD cannot be bypassed by the user. The security policy function may be implemented in a procedural language provided by the database (such as PL/SQL in Oracle databases), but may access functionality implemented in other programming languages such as C or Java.

Consequently, as a result of implementing security policies using VPD, two database users may submit identical queries but receive different results depending on the functions implementing the organization's security policies. In this illustration, a database contains two tables: a table Payroll 225 containing an organization's information on, e.g., employee salaries, wages paid, and taxes withheld; and table Employee 230 storing personal and contact information for employees of the organization. The organization's management has determined that access to data in table Payroll 225 and table Employee 230 should be restricted according to the following rules:

(1) Employees in the Payroll department may view all rows in table Payroll 225 except those of their fellow co-workers in Payroll;

(2) Employees not in the Payroll department may view only their own payroll records in table Payroll 225;

(3) Managers may views all rows in table Employee 230 for employees in their department; and (4) Non-managers may view only their own records in table Employee 230.

To implement these rules using VPD, the organization has defined security policy functions 235 and 245. Security policy function 235, associated with table Payroll 225 by the database's VPD functionality, encapsulates logic 240 necessary to implement rules (1) and (2) above by generating a predicate that is appended to queries made on table Payroll 225. Similarly, security policy function 245, associated with table Employee 230 by the database's VPD functionality, encapsulates logic 250 necessary to implement rules (3) and (4) above by generating a predicate that is appended to queries made on table Employee 230. Each of security policy functions 235 and 245 is generally designed, coded, tested, implemented, and maintained separately, and changes to either function may necessitate further design, testing, and deployment of that function.

In FIG. 2, User 200 is John Smith, who works in the Payroll department and has a user ID of ABC123. User 200 submits two queries to the database. Query 205 is made on table Payroll 225 and includes the SQL statement "SELECT * FROM PAYROLL." Submitted directly to the database, without further processing by VPD, query 205 would return all rows in table Payroll 225. However, query 205 is further processed by security policy function 235, which applies logic 240 to determine the appropriate predicate to append to query 205 to limit User 200's access to the data in table Payroll 225. Here, because User 200 works in the Payroll department, security policy 235 determines that the appropriate predicate is "DEPT !='PAYROLL'", and the modified query 215 that is actually executed by the database includes the SQL statement "SELECT * FROM PAYROLL WHERE DEPT !='PAYROLL'". Modified query 215 thus returns all rows in table Payroll 225 except those where the DEPT column has the value 'PAYROLL.'

Similarly, User 200 submits query 210, which includes the SQL statement "SELECT * FROM EMPLOYEE", and which would return all rows in table Employee 230 if not modified by VPD. However, because User 200 is not a manager, security policy 245 applies logic 250 to determine that the appropriate predicate to append to query 210 is "EMP_ID='ABC123'", and the modified query 220 that is actually executed by the database includes the SQL statement "SELECT * FROM EMPLOYEE WHERE EMP_ID='ABC123'". Modified query 220 thus returns only User 200's row in table Employee 230.

In FIG. 3, User 300 is Jane Doe, a manager who works in the Sales department and has a user ID of DEF456. User 300 submits queries 305 and 310, which include the same SQL statements previously submitted by User 200 as queries 205 and 210, respectively. However, because User 300 works in the Sales department and not in Payroll, security policy 235 determines that the appropriate predicate to be appended to query 305 is "EMP_ID='DEF456'", and the modified query 315 that is actually executed by the database includes the SQL statement "SELECT * FROM PAYROLL WHERE EMP_ID='DEF456'". Modified query 315 thus returns only User 300's row in table Payroll 225. Likewise, because user 300 is a manager in the Sales department, security policy 245 determines that the appropriate predicate to append to query 310 is "DEPT='SALES'", and the modified query 320 that is actually executed by the database includes the SQL statement "SELECT * FROM EMPLOYEE WHERE DEPT='SALES'". Modified query 320 thus returns all rows in table Employee 230 where the DEPT column contains the value "SALES".

Figure 4:
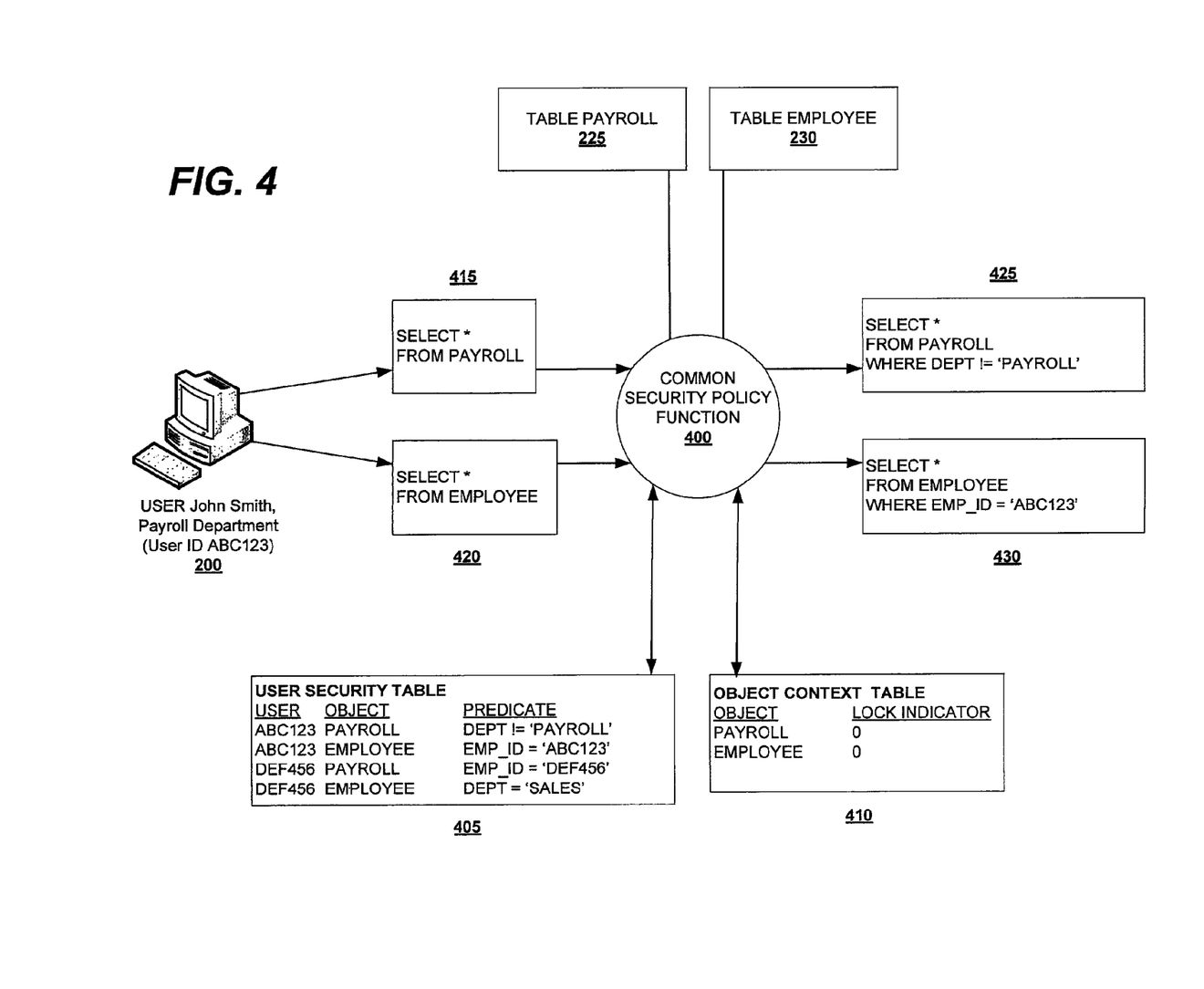
FIGS. 4 and 5 are block diagram illustrating using VPD in conjunction with a common security policy function, a user security table, and an object context table, to modify database queries in order to restrict access to data on a per-user basis in accordance with some embodiments.
Figure 5:
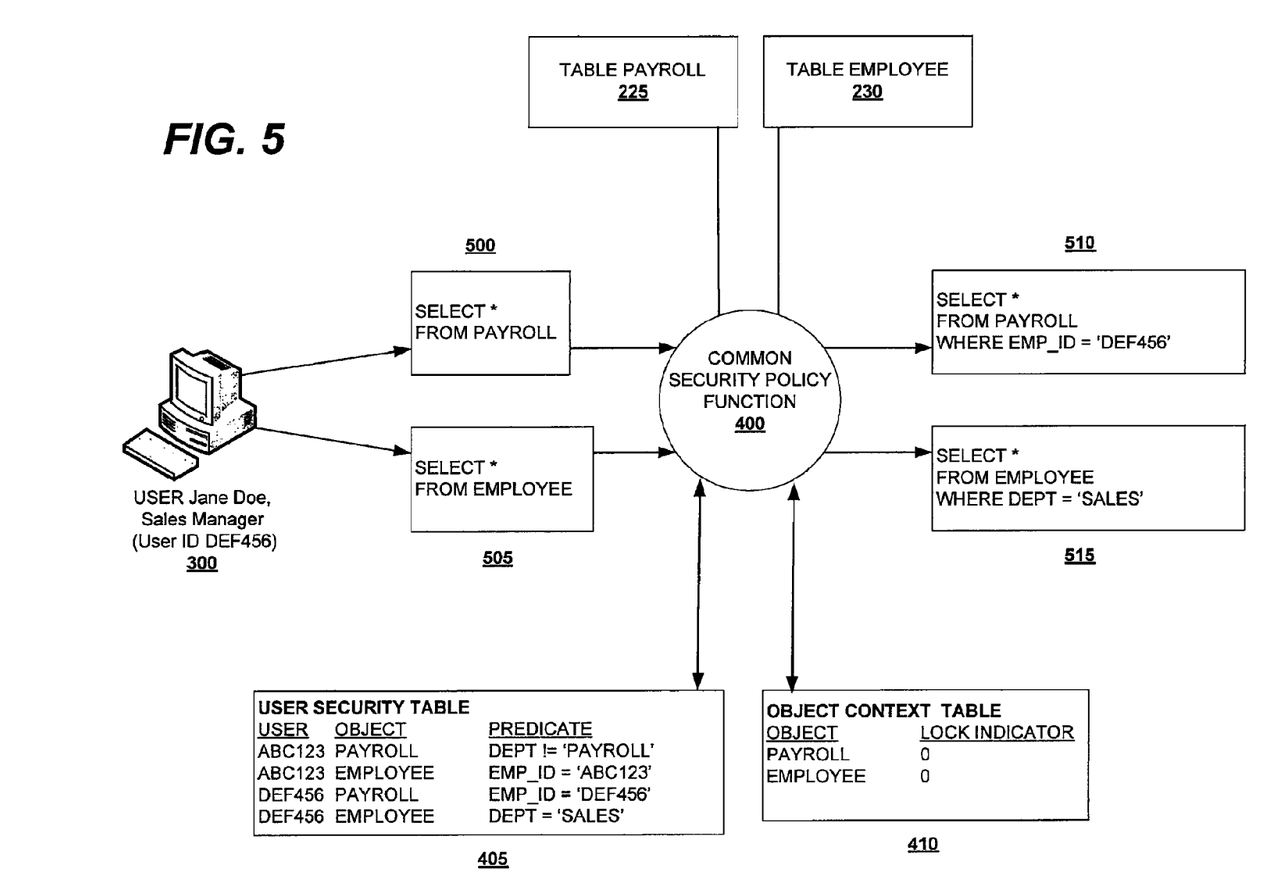

FIGS. 4 and 5 are block diagrams illustrating an embodiment using VPD functionality in conjunction with a common security policy function, a user security table, and an object context table to modify database queries in order to restrict access to data on a per-user basis. In contrast with the process described in FIGS. 2 and 3 using security policy functions 235 and 245, the method illustrated in FIG. 4 uses a single common security policy function 400 which is associated by the database's VPD functionality with both table Payroll 225 and table Employee 230. Rather than encapsulating logic particular to the data access rules for one specific database object, common security policy function 400 generates predicates for both table Payroll 225 and table Employee 230 based on the data in user security table 405 and object context table 410. User security table 405 contains rows, each of which includes a user ID, the name of a database object, and a first predicate. Object context table 410 contains rows, each of which includes the name of a database object and a lock indicator, which signals whether access to the associated database object should be denied for all users. User security table 405 and object context table 410 may be linked, e.g. by a foreign key relationship defined in the database, to ensure that the database object named in each row of user security table 405 corresponds to a database object named in a row of object context table 410.

In FIG. 4, User 200 again submits two queries to the database. Query 415, like query 205 discussed above, is made on table Payroll 225 and includes the SQL statement "SELECT * FROM PAYROLL." Submitted directly to the database, without further processing by VPD, query 415 would return all rows in table Payroll 225. However, query 415 is further processed by common security policy function 400, which generates an appropriate second predicate based on the row or rows in user security table 405 that reference both User 200's user ID as well as the name of table Payroll 225. Here, the common security policy function 400 determines that the appropriate second predicate to append to query 415 to limit User 200's access to the data in table Payroll 225 is "DEPT !='PAYROLL'", based on the first predicate in the row in the user security table 405 that references both user ID "ABC123" and database object "PAYROLL". Accordingly, the modified query 425 that is actually executed by the database includes the SQL statement "SELECT * FROM PAYROLL WHERE DEPT !='PAYROLL'", which returns all rows in table Payroll 225 except those where the DEPT column has the value 'PAYROLL,'

Similarly, User 200 submits query 420, which, like query 210 discussed above, includes the SQL statement "SELECT * FROM EMPLOYEE", and which would return all rows in table Employee 230 if not modified by VPD. However, common security policy function 400 determines, based on the first predicate in the row in the user security table 405 that references both user ID "ABC123" and database object "EMPLOYEE", that the appropriate second predicate to append to query 420 is "EMP_ID='ABC123'", and the modified query 430 that is actually executed by the database includes the SQL statement "SELECT * FROM EMPLOYEE WHERE EMP_ID='ABC123'". Modified query 430 thus returns only User 200's row in table Employee 230.

In FIG. 5, User 300 submits queries 500 and 505, which include the same SQL statements submitted by User 200 as queries 415 and 420, respectively. Based on the first predicate in the row in user security table 405 that references both user ID "DEF456" and database object "PAYROLL", common security policy function 400 determines that the appropriate second predicate to be appended to query 500 is "EMP_ID='DEF456'", and, thus, the modified query 510 that is actually executed by the database includes the SQL statement "SELECT * FROM PAYROLL WHERE EMP_ID='DEF456'". Modified query 510, therefore, returns only User 300's row in table Payroll 225. Likewise, common security policy function 400 determines, based on the first predicate in the row in user security table 405 that references both user ID "DEF456" and database object "EMPLOYEE", that the appropriate second predicate to append to query 505 is "DEPT='SALES'", and the modified query 515 that is actually executed by the database includes the SQL statement "SELECT * FROM EMPLOYEE WHERE DEPT='SALES'". Modified query 515, thus, returns all rows in table Employee 230 where the DEPT column contains the value "SALES".

In the examples described above in FIGS. 4 and 5, access to the data in tables Payroll 225 and Employee 230 was granted to both Users 200 and 300 because the lock indicator for both tables is set to "0" (representing a status of "unlocked") in object context table 410. Should the database administrator determine that access to one or both of the tables should be denied to all users, the table(s) may be "locked" by setting the appropriate lock indicator(s) in object context table 410 to "1". In that case, when a user submits a query on a locked table, common security policy function 400 determines, based on the lock indicator in the row in object context table 410 that refers to the queried table, that the appropriate second predicate to append to the submitted query is "1=2", or some other expression that always logically evaluates to false. Consequently, the query as modified by VPD will include "1=2" in the WHERE portion of the SQL statement, and thus will return no rows.

Figure 6:
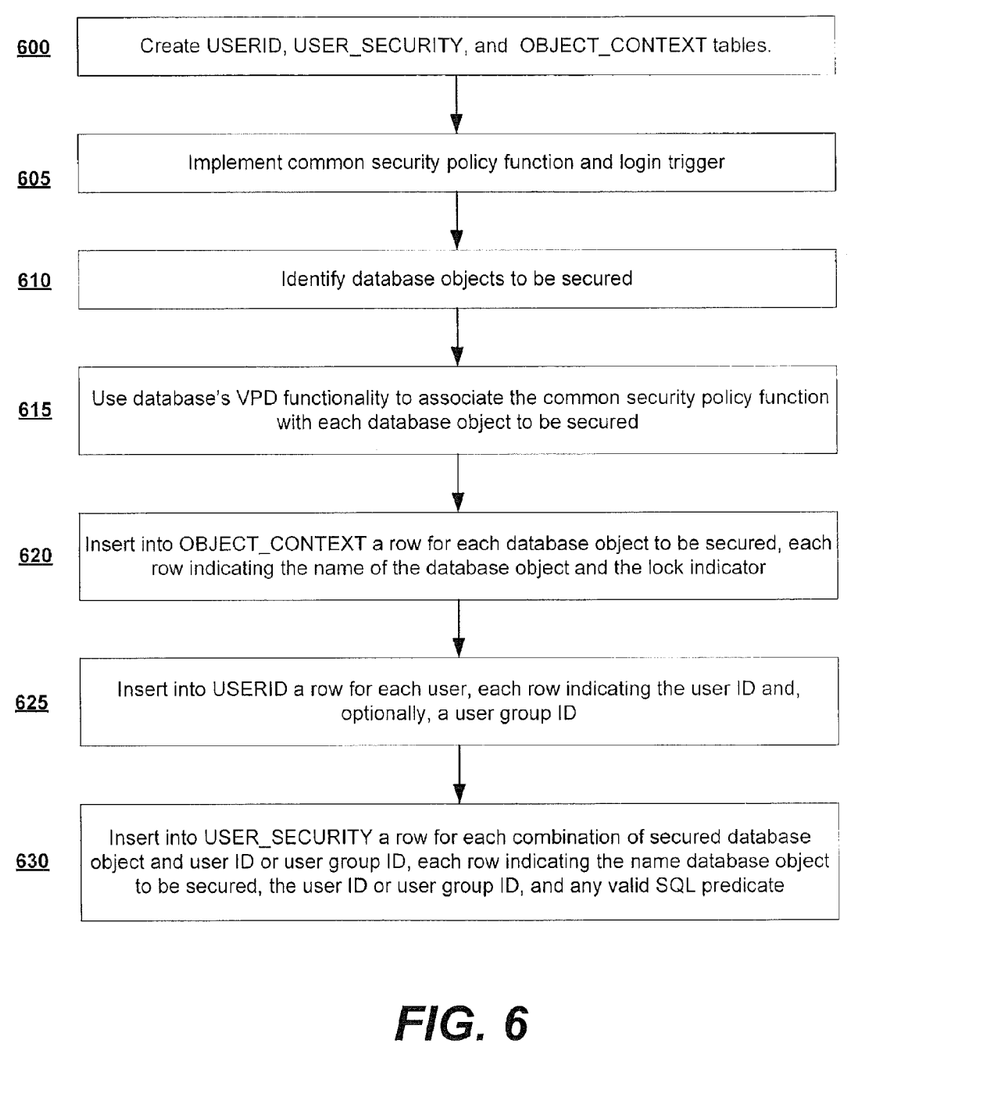
FIG. 6 is a flowchart illustrating at a high level the implementation of a generic database security application in accordance with some embodiments.

FIG. 6 is a flowchart illustrating at a high level the implementing of a generic database security application according to some embodiments. The implementation process is carried out by, e.g., a database administrator or user with sufficient access rights. The implementation process begins at block 600, where the database administrator creates tables USERID, USER_SECURITY, and OBJECT_CONTEXT in the database. Tables USER_SECURITY and USERID may be linked, e.g. by a foreign key relationship defined in the database, to ensure that the user ID or user group named in each row of USER_SECURITY corresponds to a user ID or user group named in a row of USERID. Likewise, tables USER_SECURITY and OBJECT_CONTEXT may be linked, e.g. by a foreign key relationship defined in the database, to ensure that the database object named in each row of USER_SECURITY corresponds to a database object named in a row of OBJECT_CONTEXT. At block 605, the database administrator implements the common security policy function and the login trigger. This may include, for instance, designing, coding, and testing the common security policy function and the login trigger, and deploying the common security policy function and the login trigger to the database environment. In some embodiments, the login trigger may be a database trigger that executes in response to the user's logging in. Next, the database administrator at block 610 identifies the database objects to be secured. Database objects, in this context, may refer to tables, views, or any other database entities to which data access may be restricted via the use of VPD in conjunction with security policy functions. At block 615, the database administrator then uses the database's VPD functionality to associate the common security policy function with each database object to be secured. At block 620, the database administrator inserts in table OBJECT_CONTEXT a row for each database object to be secured, with each row indicating the name of the database object and the lock indicator for that database object. The database administrator at block 625 inserts into table USERID a row for each user, with each row indicating the user ID, and optionally, a user group ID. The rows in table USERID may also optionally include personally-identifying information, such as last and first name Finally, at block 630, the database administrator inserts into table USER_SECURITY a row for each combination of user ID (or user group ID) and database object to be secured, with each row indicating the user ID or user group ID, the name of the database object to be secured, and a valid SQL predicate. The SQL predicate in each row will be appended by the common security function to queries made on the named database object by any querying user having the user ID or user group ID specified. Rules for restricting database access can thus be implemented by specifying a suitably restrictive SQL predicate to be appended to queries by particular users or groups of users on particular database objects.

Figure 7:
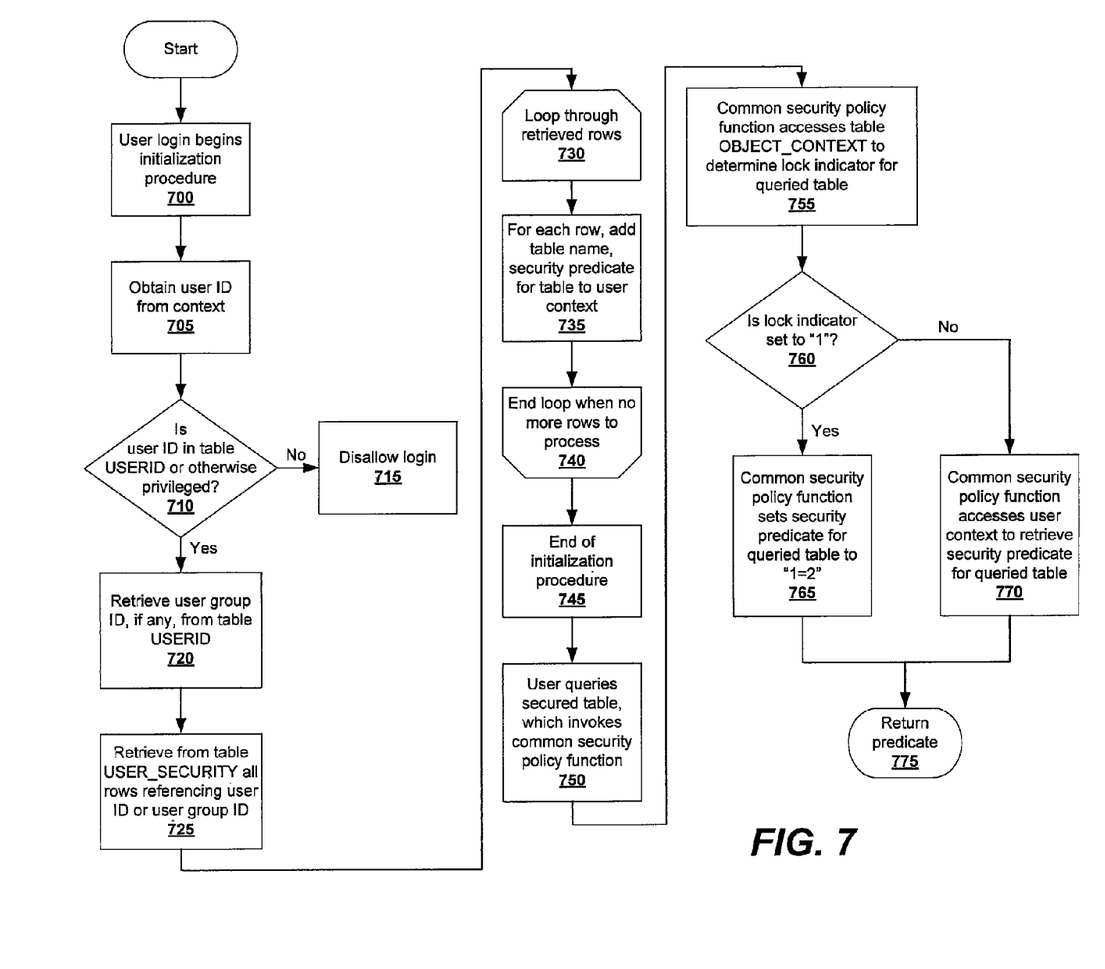
FIG. 7 is a flowchart illustrating at a high level the logical flow of providing a generic database security application in accordance with some embodiments.

FIG. 7 is a flowchart illustrating at a high level the logical flow for providing a generic database security application according to an embodiment. The flow starts at block 700 when the user logs into the database, triggering the start of the initialization procedure. The initialization procedure may be started in response to, for instance, a database trigger executing in response to the user's logging in. At block 705, the initialization procedure obtains the user ID from the application context. At decision block 710, the initialization procedure determines if the user ID is found in table USERID, or if the user ID is otherwise privileged (e.g., a database system ID). If not, the procedure proceeds to block 715, where the user's login is disallowed. If, however, the user ID is found in table USERID or is determined to be otherwise privileged, then the user group ID, if any, for the user is retrieved from table USERID at block 720. At block 725, the initialization procedure retrieves all rows in table USER_SECURITY that reference the user ID or user group ID of the logging-in user. A processing loop begins at block 730, in which each row retrieved from table USER_SECURITY is processed. At block 735, the table name and the second predicate from the retrieved row are added to the application context, or to some other implementation of session-persistent storage. The processing loop concludes at block 740; the loop repeats at block 730 until there are no further rows to process. Once the loop has terminated, the initialization process concludes at block 745, at which point the user's database login is complete.

At block 750, the user issues a query on a secured database table, which causes the database's VPD functionality to invoke the common security policy function. The common security policy function accesses the OBJECT_CONTEXT table at block 755 to determine the lock indicator for the queried table. At decision block 760, the common security policy function evaluates the value of the table's lock indicator. If the lock indicator is set to "1", then access to the table is to be denied to all users. In this case, as seen at block 765, the common security policy function sets the predicate to be returned to "1=2" (or some other expression that always logically evaluates to false). This ensures that, no matter what query is executed on the table, the query as modified by VPD will include "1=2" in the WHERE portion of the SQL statement, and thus will never return any rows. If, however, the lock indicator is set to "0", then the common security policy function at block 770 accesses the application context to retrieve the predicate for the queried table. Finally, at block 775, the predicate is returned, and the VPD functionality appends the predicate to the submitted query and executes the query on the secured database table.

It will be appreciated that while FIG. 7 discloses one particular method, that in other embodiments, various of the operations of FIG. 7 may be omitted. It will also be appreciated that a system or computer program product that carries out some or all of the operations of FIG. 7 may also carry out additional operations relating to, for example, logging in a user. It will be further appreciated that while in the flow chart of FIG. 7 the operations are shown as comprising separate operations, these operations may be performed together in a single step in some embodiments.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

What is claimed is:

1. A method of providing a generic database security application, comprising:
    operating, using a programmed computer processor circuit, a database providing virtual private database functionality;
    inserting a plurality of rows into a user security table in the database, each of the rows comprising one of a first user identification and user group for which database access is to be controlled, the name of a first database object to be secured in the database, and a first predicate;
    defining in the database a common security policy function that generates a second predicate to be appended by the virtual private database functionality to a query made on one of the first database objects by a querying user, the second predicate being generated based on a first predicate in a row in the user security table, the row referencing a name of the one of the first database objects and one of the user identification and user group of the querying user;
    using the virtual private database functionality to associate the common security policy function with each of the first database objects named in the user security table; and
    inserting a plurality of rows into a user table in the database, each of the rows of the user table comprising a second user identification and a user group, for which database access is to be controlled;
    linking the user table with the user security table, such that one of the first user identification and user group in each row in the user security table corresponds to one of a second user identification and user group in respective rows of the user table; and
    allowing the querying user to log in to the database only if the querying user's user identification is present in the user table;
    wherein the user security table and the user table are separate tables in the database; and
    wherein the second predicate generated by the common security policy function is based on the first predicate.

2. The method of claim 1, further comprising:
    in response to the querying user's logging into the database, and prior to the querying user's querying the database:
    retrieving from the user security table a row referencing one of the user identification and user group of the querying user; and
    storing the first predicate from the row that was retrieved in a session-persistent storage.

3. The method of claim 1, further comprising:
    inserting a plurality of rows into an object context table in the database, each of the rows of the object context table comprising the name of a second database object to be secured in the database, and a lock indicator indicating whether access to the second database object should be denied for all querying users; and
    linking the object context table with the user security table, such that the first database object named in each row in the user security table corresponds to a second database object named in a row in the object context table;
    wherein the second predicate generated by the common security policy function is further based on the lock indicator.

4. A system for providing a generic database security application, comprising:
    a processor;
    a memory coupled to the processor and having a database therein;
    the database providing a virtual private database;
    a user security table in the database containing rows, each of the rows comprising one of a first user identification and user group for which database access is to be controlled, the name of a first database object to be secured in the database, and a first predicate; and
    a common security policy function in the database, the common security policy function generating a second predicate to be appended by the virtual private database functionality to a query made on one of the first database objects by a querying user, the second predicate being generated based on a first predicate in a row in the user security table, the row referencing a name of the one of the first database objects and one of the user identification and user group of the querying user,
    the common security policy function using the virtual private database functionality to associate the common security policy function with each of the first database objects named in the user security table; and
    a user table in the database containing rows, each of the rows of the user table comprising a second user identification and a user group, for which database access is to be controlled, and associated with the user security table such that one of the first user identification and user group in each row in the user security table corresponds to one of a second user identification and user group in respective rows of the user table;
    wherein the database is to allow the querying user to log in to the database only if the querying user's user identification is present in the user table; and
    wherein the user security table and the user table are separate tables in the database; and
    wherein the second predicate generated by the common security policy function is based on the first predicate.

5. The system of claim 4, further comprising:
a trigger defined in the database to detect the querying user's logging into the database; and
a function executing in response to the trigger, the function retrieving from the user security table a row referencing one of the user identification and user group of the querying user, and storing the first predicate from the row that was retrieved in a session-persistent storage.

6. The system of claim 4, further comprising:
an object context table in the database containing rows, each of the rows of the object context table comprising the name of a second database object to be secured in the database, and a lock indicator indicating whether access to the second database object should be denied for all users,
the object context table associated with the user security table such that the first database object named in each row in the user security table corresponds to a second database object named in a row in the object context table;
wherein the second predicate generated by the common security policy function is further based on the lock indicator.

7. A computer program product for providing a generic database security application, the computer readable program product comprising a tangible computer readable storage medium having computer readable program code embodied therein that when executed by a processor causes the operator to perform operations comprising:
operating, using a programmed computer processor circuit, a database providing virtual private database functionality;
inserting a plurality of rows into a user security table in the database, each of the rows comprising one of a first user identification and user group for which database access is to be controlled, the name of a first database object to be secured in the database, and a first predicate;
defining in the database a common security policy function that generates a second predicate to be appended by the virtual private database functionality to a query made on one of the first database objects by a querying user, the second predicate being generated based on a first predicate in a row in the user security table, the row referencing a name of the one of the first database objects and one of the user identification and user group of the querying user;
using the virtual private database functionality to associate the common security policy function with each of the first database objects named in the user security table; and
inserting a plurality of rows into a user table in the database, each of the rows of the user table comprising a second user identification and a user group, for which database access is to be controlled;
linking the user table with the user security table, such that one of the first user identification and user group in each row in the user security table corresponds to one of a second user identification and user group in respective rows of the user table; and
allowing the querying user to log in to the database only if the querying user's user identification is present in the user table;
wherein the user security table and the user table are separate tables in the database; and
wherein the second predicate generated by the common security policy function is based on the first predicate.

8. The computer program product of claim 7, wherein the operations further comprise:
detecting the querying user's logging in to the database;
retrieving from the user security table a row referencing one of the user identification and user group of the querying user; and
storing the first predicate from the row that was retrieved in a session-persistent storage.

9. The computer program product of claim 7, wherein the operations further comprise:
inserting a plurality of rows into an object context table in the database, each of the rows of the object context table comprising the name of a second database object to be secured in the database, and a lock indicator indicating whether access to the second database object should be denied for all querying users;
associating the object context table with the user security table, such that the first database object named in each row in the user security table corresponds to a second database object named in a row in the object context table;
wherein the second predicate generated by the common security policy function is further based on the lock indicator.

* * * * *